US008868712B2

(12) United States Patent
Kiris et al.

(10) Patent No.: US 8,868,712 B2
(45) Date of Patent: Oct. 21, 2014

(54) EFFECTIVE VISUALIZATION OF AN INFORMATION TECHNOLOGY ENVIRONMENT THROUGH SOCIAL SCORING

(75) Inventors: Esin Kiris, Holmdel, NJ (US); Serge Mankovskii, Santa Clara, CA (US); Maria Velez-Rojas, Dublin, CA (US)

(73) Assignee: CA, Inc., Islandia, NY (US)

( * ) Notice: Subject to any disclaimer, the term of this patent is extended or adjusted under 35 U.S.C. 154(b) by 272 days.

(21) Appl. No.: 13/367,037

(22) Filed: Feb. 6, 2012

(65) Prior Publication Data
US 2013/0204992 A1 Aug. 8, 2013

(51) Int. Cl.
*G06F 15/173* (2006.01)
*H04L 12/24* (2006.01)
*H04L 29/08* (2006.01)

(52) U.S. Cl.
CPC ............ *H04L 41/0856* (2013.01); *H04L 41/22* (2013.01); *H04L 67/22* (2013.01)
USPC ........... 709/223; 709/203; 709/204; 709/206; 709/224; 379/265.08; 379/265.09; 379/88.01

(58) Field of Classification Search
CPC ... H04L 41/22; H04L 12/586; H04L 41/0856; H04L 67/22; H04L 67/306; G06F 3/0605
USPC ................................ 709/203–206, 223–224; 379/265.08–265.09, 88.01
See application file for complete search history.

(56) References Cited

U.S. PATENT DOCUMENTS

| 6,272,537 | B1 | 8/2001 | Kekic et al. .................... 709/223 |
| 6,496,208 | B1 | 12/2002 | Bernhardt et al. ............. 345/853 |
| 6,594,696 | B1 | 7/2003 | Walker et al. .................. 709/223 |
| 7,434,172 | B1 | 10/2008 | Christensen et al. .......... 715/772 |
| 7,552,188 | B2 | 6/2009 | Kato et al. ...................... 709/213 |
| 7,603,632 | B1 | 10/2009 | Aamodt et al. ................ 715/853 |
| 7,864,946 | B1 * | 1/2011 | Fama et al. .............. 379/265.06 |
| 7,941,339 | B2 | 5/2011 | Argaiz ......................... 705/14.49 |
| 2005/0120030 | A1 | 6/2005 | Varpela et al. ................. 707/100 |
| 2007/0055520 | A1 | 1/2007 | Eick et al. ......................... 706/12 |
| 2007/0113185 | A1 | 5/2007 | MacLeod et al. .............. 715/734 |
| 2008/0037761 | A1 * | 2/2008 | Cordell et al. ............ 379/265.04 |
| 2008/0114755 | A1 | 5/2008 | Wolters et al. ...................... 707/5 |
| 2008/0189724 | A1 | 8/2008 | Tien et al. ....................... 719/329 |
| 2008/0320131 | A1 | 12/2008 | Chalmers et al. ............. 709/224 |
| 2009/0089678 | A1 | 4/2009 | Sacco et al. .................... 715/733 |
| 2009/0164624 | A1 | 6/2009 | Metcalf et al. ................. 709/224 |
| 2009/0296600 | A1 | 12/2009 | Canright et al. ............... 370/254 |
| 2010/0106752 | A1 | 4/2010 | Eckart, III et al. ............. 707/805 |
| 2010/0262606 | A1 | 10/2010 | Bedolla et al. ................. 707/741 |
| 2010/0322408 | A1 * | 12/2010 | Foster et al. .............. 379/266.06 |

(Continued)

*Primary Examiner* — Hitesh Patel
(74) *Attorney, Agent, or Firm* — Baker Botts, LLP

(57) ABSTRACT

According to one embodiment, a method may include providing a representation of each of a plurality of nodes of an information technology (IT) environment to a plurality of administrators responsible for maintaining the IT environment. A plurality of scores for each of two or more of the plurality of nodes may be received. Each score may provide an assessment of a respective node of the plurality of nodes. One or more display characteristics may be determined for each node for which one or more scores was received. The display characteristics may comprise a size of a respective node that is based on the scores received for the respective node. The display characteristics may be provided to at least one administrator of the plurality of administrators responsible for maintaining the IT environment.

22 Claims, 3 Drawing Sheets

(56) References Cited

U.S. PATENT DOCUMENTS

| | | |
|---|---|---|
| 2011/0022602 A1 | 1/2011 | Luo et al. ....................... 707/748 |
| 2011/0055699 A1 | 3/2011 | Li et al. ......................... 715/709 |
| 2011/0113385 A1 | 5/2011 | Sayers et al. ................. 715/853 |
| 2011/0126108 A1 | 5/2011 | Beaudoin et al. ............. 715/734 |
| 2011/0173191 A1 | 7/2011 | Tsaparas et al. .............. 707/723 |
| 2011/0276396 A1* | 11/2011 | Rathod ....................... 705/14.49 |
| 2012/0101865 A1* | 4/2012 | Zhakov ........................ 705/7.13 |
| 2013/0142322 A1* | 6/2013 | Grasso et al. ............ 379/265.08 |

* cited by examiner

EFFECTIVE VISUALIZATION OF AN INFORMATION TECHNOLOGY ENVIRONMENT THROUGH SOCIAL SCORING

TECHNICAL FIELD

This invention relates generally to the field of information technology and more specifically to effective visualization of an information technology environment through social scoring.

BACKGROUND

An information technology (IT) environment may include various nodes that provide services and resources to users of the IT environment. An IT environment may have one or more administrators that are collectively responsible for maintaining the operability of the IT environment. In order to troubleshoot problems in the IT environment, the administrators may consult a display that includes a representation of some or all of the nodes of the IT environment.

SUMMARY

According to one embodiment of the present disclosure, a method for providing effective visualization of an information technology (IT) environment through social scoring may be provided. The method may include providing a representation of each of a plurality of nodes of an IT environment to a plurality of administrators responsible for maintaining the IT environment. A plurality of scores for two or more of the plurality of nodes may be received. Each score may provide an assessment of a respective node of the plurality of nodes. One or more display characteristics may be determined for each node for which one or more scores was received. The one or more display characteristics of a respective node may comprise a size of the respective node that is based on at least the scores received for the respective node. The one or more display characteristics determined for each node for which one or more scores was received may be provided to at least one administrator of the plurality of administrators responsible for maintaining the IT environment.

Certain embodiments of the disclosure may provide one or more technical advantages. A technical advantage of one embodiment may be that representations of nodes of an IT environment may be effectively displayed such that a administrator may easily identify the most relevant nodes of the IT environment. Another technical advantage of one embodiment may be that administrators of the IT environment may collaborate with each other regarding individual nodes.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF EXAMPLE EMBODIMENTS

Embodiments of the present disclosure and its advantages are best understood by referring to FIGS. 1-4 of the drawings, like numerals being used for like and corresponding parts of the various drawings.

Figure 1:
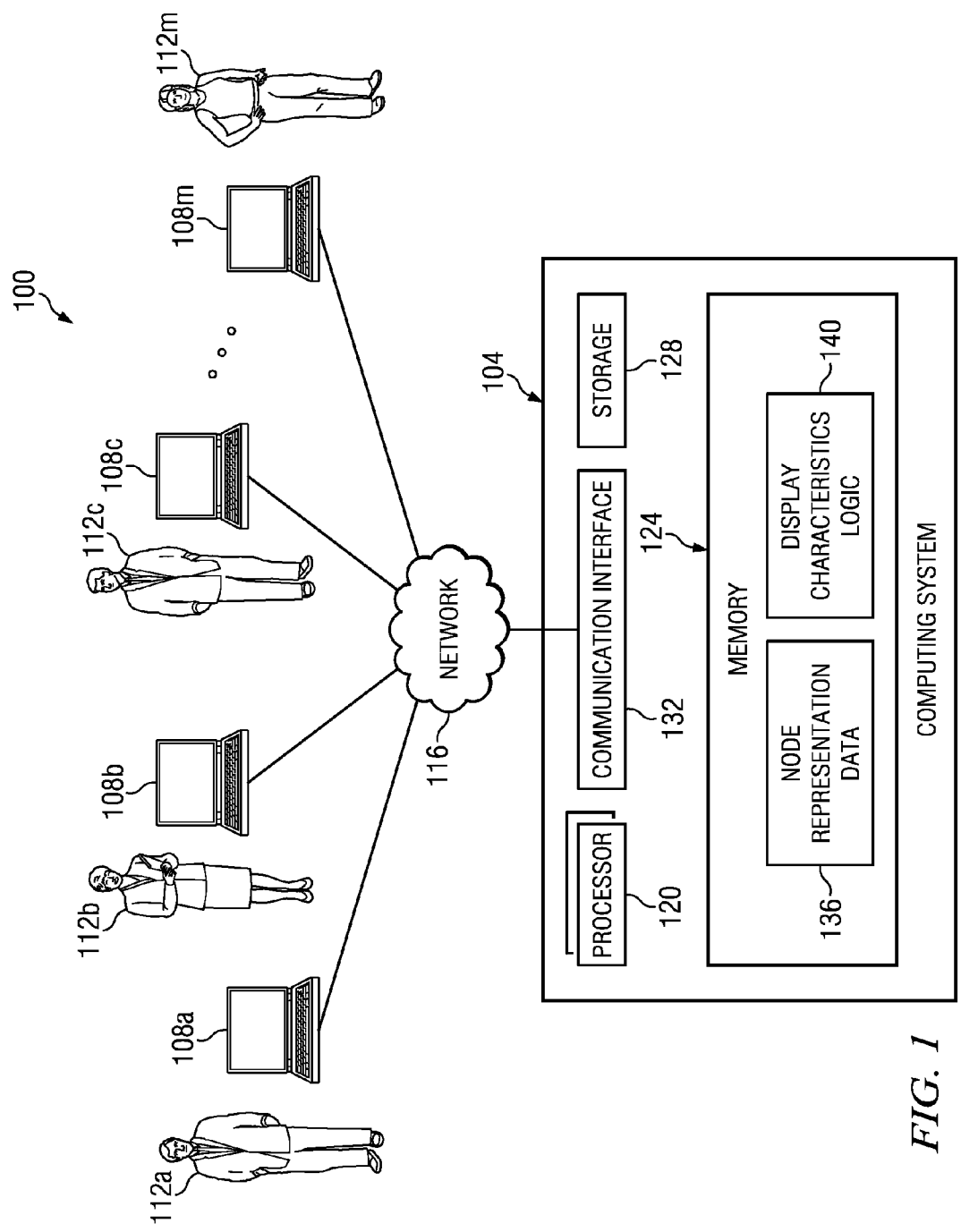
FIG. 1 depicts an example of a system for providing effective visualization of an information technology (IT) environment through social scoring.

FIG. 1 depicts an example of a system 100 for providing effective visualization of an information technology (IT) environment through social scoring. System 100 includes computing system 104 coupled to user devices 108 that are each associated with a respective administrator 112 of the IT environment. A plurality of administrators 112 may share the responsibility of maintaining all or a portion of the IT environment. Computing system 104 is operable to provide a representation of each of a plurality of nodes of the IT environment to some or all of the administrators 112. In particular embodiments, the representations of the plurality of nodes may be transmitted to a user device 108 associated with an administrator 112 and the user device 108 may display representations of the plurality of nodes to the administrator 112.

Computing system 112 is also operable to receive scores of the nodes from administrators 112. In a particular embodiment, administrator 112 may provide scores for nodes via user device 108 and user device 108 may transmit the scores to computing system 104 via network 116. Each score may provide an assessment of the corresponding node. Computing system 104 may determine one or more display characteristics for each node for which it received one or more scores. In particular embodiments, the one or more display characteristics of a node include a size of the respective node based on the scores received for the node. Computing system 112 may then provide the display characteristics to at least one administrator 112 of the IT environment.

Particular embodiments of the present disclosure may enable effective visualization of nodes of an IT environment. Typical IT environments may have numerous (e.g., thousands of) different nodes. Typical programs may provide displays that are cluttered with these various nodes, making it difficult for an administrator of the IT environment to identify nodes of interest. In typical programs, an administrator may employ static filters to narrow the amount of nodes that are displayed. However, in such implementations, the administrator generally relies on his own knowledge to sift through numerous nodes. Particular embodiments of the present disclosure provide effective visualizations of IT environments by enabling collaboration among a plurality of administrators 112. This collaboration may include scoring of the various nodes by the administrators 112 according to various criteria. This collaboration may also include the sharing of information about the nodes among the administrators 112. Particular embodiments may enable an administrator 112 to identify a node of interest quickly and to access information regarding the node of interest that is provided by other administrators 112.

In the embodiment depicted in FIG. 1, system 100 includes a computing system 104. Computing system 104 may be any suitable combination of hardware and/or software that enables the effective visualization of an IT environment through social scoring. Computing system 104 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein.

Components of the one or more computer systems may comprise any suitable physical form, configuration, number, type, and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed, span multiple locations, span multiple machines, or reside in a cloud, which may include one or more cloud components in one or more networks.

Where appropriate, the one or more computer systems may perform without substantial spatial or temporal limitation one or more steps of one or more methods described or illustrated herein. As an example, and not by way of limitation, the one or more computer systems may perform in real time or in batch mode one or more steps of one or more methods described or illustrated herein. The one or more computer systems may perform at different times or at different locations one or more steps of one or more methods described or illustrated herein, where appropriate.

In particular embodiments, a computer system may include a processor, memory, storage, and a communication interface. As an example, computing system 104 comprises a computer system that includes one or more processors 120, memory 124, storage 128, and a communication interface 132. These components may work together in order to provide functionality described herein.

A processor 120 may be a microprocessor, controller, or any other suitable computing device, resource, or combination of hardware, stored software and/or encoded logic operable to provide, either alone or in conjunction with other components of computing system 104, computing system functionality. In some embodiments, computing system 104 may utilize multiple processors to perform the functions described herein.

Memory 124 and/or storage 128 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 124 and/or storage 128 may store any suitable data or information utilized by computing system 104, including software embedded in a computer readable medium, and/or encoded logic incorporated in hardware or otherwise stored (e.g., firmware). Memory 124 and/or storage 128 may also store the results and/or intermediate results of the various calculations and determinations performed by processor 120.

In some embodiments, memory 124 and/or storage 128 may store node representation data 136. Node representation data 136 may include information associated with the nodes of the IT environment. For example, node representation data 136 may include display characteristics (e.g., size, color, or shape) for some or all of the nodes of the IT environment. As another example, node representation data 136 may include scores or other information (e.g., comments) received from administrators 112 regarding various nodes of the IT environment.

In particular embodiments, the operations of the embodiments may be performed by one or more computer readable media (such as display characteristics logic 140 of memory 124) encoded with a computer program, software, computer executable instructions, and/or instructions capable of being executed by a computing system. In particular embodiments, the operations of the embodiments may be performed by one or more computer readable media storing, embodied with, and/or encoded with a computer program and/or having a stored and/or an encoded computer program.

Communication interface 132 may be used for the communication of signaling and/or data between computing system 104 and one or more networks and/or components coupled to a network. For example, communication interface 132 may be used to communicate data with user devices 108 through network 116.

User device 108 may also include one or more portions of one or more computer systems with components similar to those described above. In particular embodiments, computing system 104 or user device 108 may also include a display to facilitate interaction with one or more users, such as administrator 112. A display may comprise any device or combination of devices capable of providing a visual representation of data. As an example, a display may be a computer monitor or other screen.

Network 116 of system 100 represents any suitable network operable to facilitate communication between the components of system 100, such as computing system 104 and user devices 108. Network 116 may include any interconnecting system capable of transmitting audio, video, signals, data, messages, or any combination of the preceding. Network 116 may include all or a portion of a public switched telephone network (PSTN), a public or private data network, a local area network (LAN), a metropolitan area network (MAN), a wide area network (WAN), a local, regional, or global communication or computing system network, such as the Internet, a wireline or wireless network, an enterprise intranet, or any other suitable communication link, including combinations thereof, operable to facilitate communication between the components.

Administrators 112*a-m* are individuals responsible for maintaining an IT environment. An IT environment may refer to a collection of assets (e.g., hardware, software, or personnel) that facilitate the sharing of information in an organization. As an example, an IT environment could be a corporate network. An administrator 112 may have an assignment to maintain a portion of the IT environment to ensure that the portion of the IT environment functions properly. Maintaining a portion of an IT environment may include, for example, analysis of nodes (e.g., risk or performance analysis), troubleshooting nodes, managing the upgrading or replacement of nodes, other management duties, or any combination thereof.

A node is an asset or a group of assets of an IT environment. Examples of nodes include a business organization that is serviced by the IT environment, a service provided by the IT environment to one or more users of the IT environment, a network, a personnel resource, a hardware component (e.g., a computer system, switch, router, other component, or a portion thereof), a software component (e.g., a collection of files installed and run on a computing system or other hardware component), data, another suitable element, a portion of any of the preceding, or combinations thereof.

Figure 2:
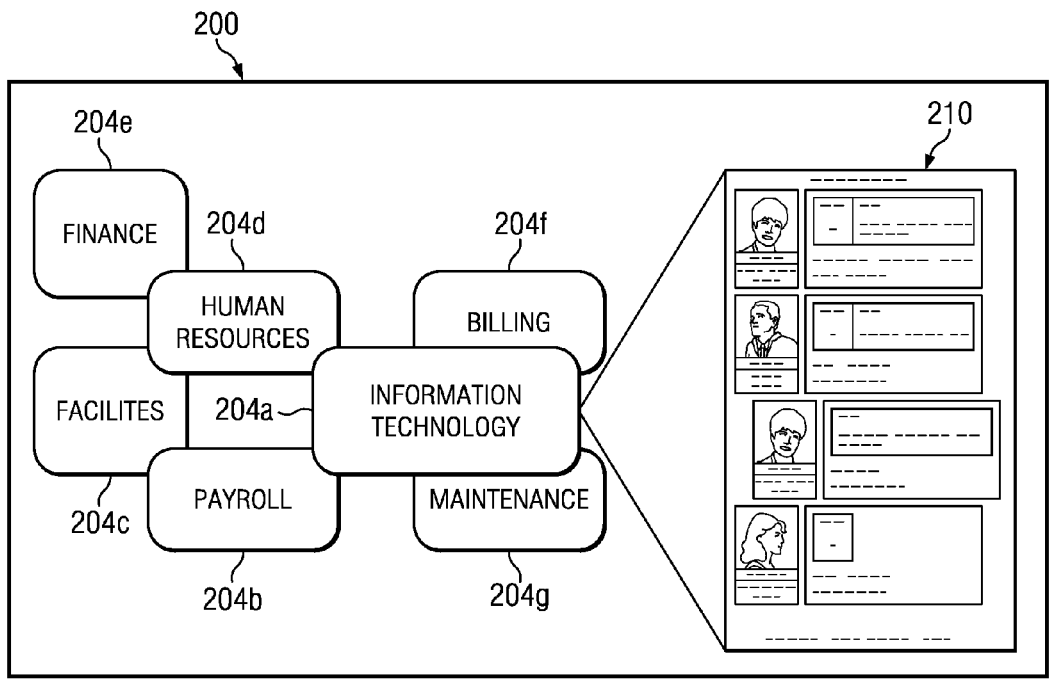
FIG. 2 depicts an example display depicting representations of various nodes of an IT environment that may be generated by the system of FIG. 1.

FIG. 2 depicts an example display 200 depicting representations of various nodes 204 of an IT environment that may be generated by system 100. Display 200 depicts a plurality of nodes 204 displayed according to a plurality of display characteristics associated with the nodes 204. In particular embodiments, display 200 may be provided by a user device 108 based on information associated with nodes 204 received from computing system 104.

Display 200 may display objective and collaborative information associated with one or more of the nodes 204. As examples of objective information, display 200 may display the connectivity of the nodes, the operating status of the nodes, the cost of the nodes, the physical location of the nodes, or any other information that may aid an administrator 112 in managing a portion of the IT environment. As examples of collaborative information, display 200 may display the nodes 204 according to various display characteristics determined based on input from the various administrators 112. For example, as depicted, nodes 204 have various sizes. In particular embodiments, nodes 204 also include a variety of shapes, colors, icons, animations, or other display characteristics. These display characteristics may be determined based on scores of the various nodes 204 provided by administrators 112. Such collaboration may enable effective visualization of the IT environment. For example, a quick glance at display 200 may notify an administrator 112 that the information technology node 204a is the most relevant node of a group of nodes 204 that correspond to divisions within an enterprise. As explained in further detail in connection with FIG. 4, display 200 may also provide one or more interfaces 210 that are each associated with a particular node 204. These interfaces may allow an administrator 112 to view or edit scores, comments, and other information associated with that node 204.

Figure 3:
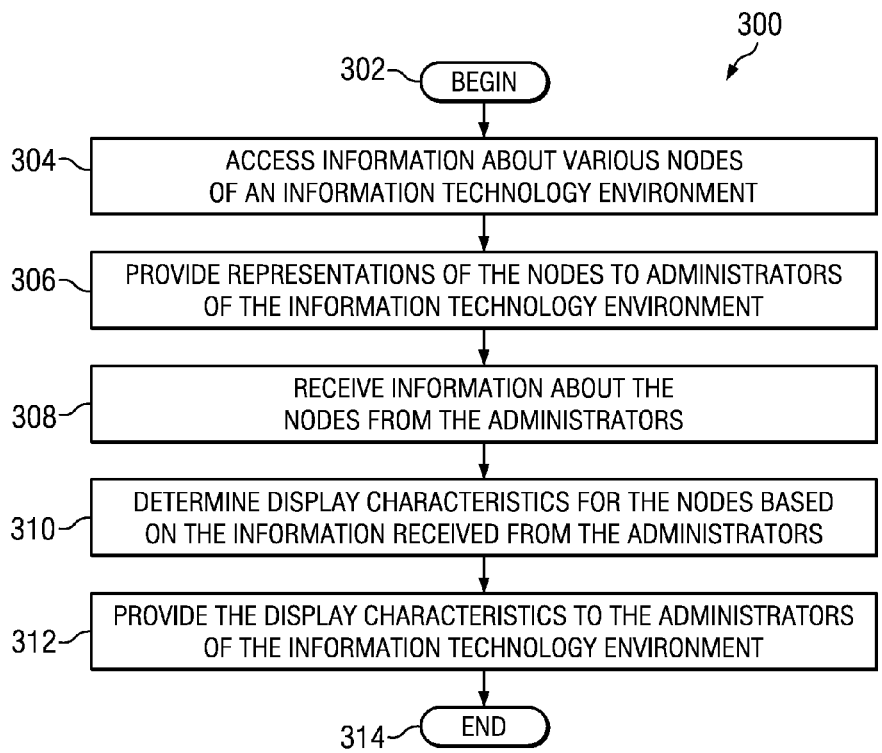
FIG. 3 depicts an example method that may be performed by the system of FIG. 1.

FIG. 3 depicts an example method 300 that may be performed by system 100. The method begins at step 302. At step 304, computing system 104 accesses information about various nodes 204 of an IT environment. For example, computing system 104 may access node representation data 136. Node representation data 136 may include data associated with the nodes 204 of the IT environment. For example, node representation data 136 may include node identifiers, display characteristics of nodes 204, and other information about the nodes 204, such as comments, scores, or other information received from administrators 112 regarding the nodes 204. As another example, node representation data 136 may also include objective information associated with nodes 204, such as a record of incidents regarding the nodes, costs of the nodes, or other information that may aid an administrator 112 in managing the IT environment.

At step 306, computing system 104 provides representations of various nodes 204 to administrators 112 of the IT environment. In particular embodiments, computing system 104 may provide all or a portion of node representation data 136 or a derivative thereof to user devices 108 associated with administrators 112. User device 108 may receive this information and display a representation of one or more of the nodes 204 to an administrator 112 according to the information received from computing system 104. For example, each node may be displayed to the administrator 112 according to a size, color, shape, or other display characteristic associated with the node in the node representation data 136. In particular embodiments, if computing system 104 has not received scores from administrators 112 for a particular node 204, that node 204 may be displayed with default display characteristics. In various embodiments, a node 204 may be displayed along with information associated with the node 204, such as a score history, one or more comments made by administrators 112, objective information associated with node 204, or other data.

At step 308, computing system 104 receives information about the nodes 204 from the administrators 112. This information may include scores for the nodes 204, comments about the nodes, or other suitable information regarding the nodes. In particular embodiments, this information may be assimilated with node representation data 136 and stored by computing system 104.

In particular embodiments, an administrator 112 may score a node 204 based on the administrator's assessment of the node. The score may be any suitable metric relevant to one or more administrators. In an example embodiment, a score indicates the general importance of the node (e.g., on a scale of one to ten with ten being the most important). In another embodiment, a score indicates the priority of the node (e.g., a priority of one may mean that the node has the highest priority). In yet another embodiment, a score indicates that a solution is required in a certain time frame represented by the score (e.g., the score may be ten minutes or three days). In some embodiments, a score is associated with a particular context. As examples, a score may be based on the relevance (e.g., importance or priority) of the node with respect to performance, reliability, security, or other suitable metric with respect to the entire IT environment or a portion thereof. As further examples, a score may be based on the relevance (e.g., importance or priority) of the node 204 with respect to a particular incident, impact assessment, risk analysis, or other IT management use case. In particular embodiments, the score is entered along with an indication describing the score (e.g., whether the score relates to an importance, priority, solution time, or other metric and/or the context of the score).

Any suitable scoring scale may be used. As examples, an administrator may grant a numerical score, an alphabetical score, a binary score (e.g., "true" if the node is important and "false" if the node is not important), or other suitable score. In particular embodiments, the scoring scale may be adjustable by one or more particular administrators 112 to fit the needs of administrators 112 of the IT environment.

In particular embodiments, an administrator 112 may score multiple nodes 204 at the same time. For example, a plurality of nodes may be grouped together by the administrator and each given the same score. In some embodiments, administrators 112 may erase, add to, or modify scores they have previously assigned to nodes 204.

In particular embodiments, administrators 112 have the option of providing one or more comments associated with particular node 204. As examples, an administrator 112 may indicate that a node 204 is important for a particular reason, that the administrator has worked on the node recently, that the node has recently been experiencing a particular issue, or other information that may be helpful to other administrators 112.

In particular embodiments, only a subset of administrators 112 are allowed to score or comment on particular nodes. For example, in a particular embodiment, only administrators 112 that are in charge of maintaining functionality of a network within the IT environment may score or comment on nodes that are components of that network. In particular embodiments, the subset of administrators 112 that are allowed to score or comment on particular nodes may be configured by one or more particular administrators 112. In some embodiments, particular administrators 112 are able to view particular nodes 204, even if they are not able to provide scores or comments associated with the nodes.

In particular embodiments, information regarding a node (e.g., scores or comments) provided by an administrator 112 is associated with profile information of that administrator and stored by computing system 104. Profile information may include any suitable information, such as the name, contact information (e.g., phone number, email address), job description (e.g., description of the management responsibilities of the administrator 112), or photo of the administrator. The information may also be linked with other information, such as the date or time the scoring or comment was provided, the context of the scoring or comment, or other suitable information.

At step 310, computing system 104 may determine display characteristics for the nodes 204 based on the information received from the administrators 112. Any suitable display characteristics may be determined. By way of example, a size, shape, color, animation, icon, other suitable display characteristic, or combination thereof may be determined for a particular node 204. In particular embodiments, nodes that are scored by administrators 112 as more relevant (e.g., more important, of higher priority, or requiring a solution in a shorter time) than other nodes are associated with larger sizes, more conspicuous shapes, colors, animations (e.g., flashing), icons, or combinations thereof. In some embodiments, the display characteristics may include comments, user profiles, or other information associated with the nodes 204.

In particular embodiments, one or more display characteristics (e.g., a color or shape) of a node 204 may be dependent on scores received for that node that are associated with a particular context (e.g., security). In some embodiments, a size of a node 204 is determined based on scores associated with the node's general importance or priority, while a color (or other display characteristic) of the node is determined based on scores received for the node that are associated with a particular context, such as security. For example, a node 204 could be assigned a display color of red if it is vital to security. Accordingly, a node 204 that is vital to security may be conspicuously displayed regardless of its general importance.

Displaying nodes 204 with various characteristics based on scoring by various administrators 112 may allow for effective visualization of the IT environment. In particular embodiments, the provision of such visualization enables an administrator 112 to utilize information provided by other administrators 112 to identify important nodes 204 of an IT environment and collaborative information regarding those nodes. Thus, instead of relying on his own information and static filter options, an administrator 112 may collaborate with other administrators 112 to manage the nodes 204 of an IT environment.

As explained above, in particular embodiments, the display characteristics of the nodes 204 are based upon the scores received for the nodes 204. In particular embodiments, one or more display score calculation methodologies may be used in conjunction with the scores received for a node 204 to determine a display score of the node. The display score may then be used to determine the display characteristics of the node 204.

A display score calculation methodology may include any suitable algorithm for calculating the display score of a node 204. In particular embodiments, a display score calculation methodology may weight each score that is received for the node 204 from an administrator 112. As an example, each score may be weighted based on the relationship between the node 204 and the administrator 112 that scored the node. Thus, scores from an administrator 112 whose management responsibilities directly involve the node 204 may be weighted higher than scores from an administrator 112 who is not directly involved with the node. In particular embodiments, the importance of the administrator 112 affects the weight given to scores from the administrator. For example, scores from a chief technology officer may be weighted more heavily than scores from a technician. In particular embodiments, each score is weighted by the amount of time that has elapsed since the score was received from the administrator (e.g., more recent scores may be weighted relatively heavily).

In some embodiments, a display score calculation methodology may utilize scores and weights in combination with one or more operations to compute the display score of the node. As an example, a weight of each score may be multiplied by the score and an operation (such as a sum, product, average, maximum, minimum, or other operation) may be performed on the weighted values to generate the display score of the node 204. In other embodiments, the weighting of scores may be omitted and the display score of the node may be determined according to one or more operations, such as a sum, product, average, maximum, minimum, count (e.g., the number of scores received may be counted), or other operation. In some embodiments, the display score calculation methodologies may be configurable by one or more of the administrators 112.

In particular embodiments, a contextual display score of a node (or a plurality of nodes) may be calculated for one or more particular contexts. In some embodiments, the context may be specified by an administrator 112. For example, computing system 112 may determine contextual display scores for a plurality of nodes 204 based on a request from an administrator 112 for a visualization of an IT environment (or a portion thereof) based on a particular context. In particular embodiments, computing system 112 may determine a contextual display score by utilizing one or more scores received from administrators 112 that each specify the particular context. In other embodiments, computing system 112 may use a display score calculation methodology that weights scores received according to the context to determine a contextual display score. For example, scores from administrators 112 with more expertise in a particular context may be weighted more heavily than scores from other administrators.

In particular embodiments, a display score calculation methodology used to determine a display score of a node 204 may take into account scores or display scores of neighboring nodes 204. In such embodiments, all other things being equal, a display score of a node 204 will be higher if the display scores of its neighboring nodes are higher.

In particular embodiments, a display score calculation methodology may take into account objective information associated with nodes 204. For example, a display score may be calculated based on information such as a number of problems reported with the node or a cost associated with the node. Thus a particular troublesome or expensive node 204 may receive a higher display score and thus be represented more conspicuously to administrators 112. In particular embodiments, a display score calculation methodology may determine a display score of a node based on objective information in combination with scores received from a plurality of administrators 112.

Computing system 104 may determine display characteristics of a node 204 based on scores received for the node from administrators 112. In various embodiments, computing system 104 determines one or more display characteristics for a node 204 based on a display score calculated for the node 204. In particular embodiments, a size of the node is determined based on a display score. In some embodiments, a size of the node 204 may be directly proportionate to a display score calculated for the node 204. In other embodiments, a plurality of sizes for nodes may be available for assignment and each size may be associated with a range of display scores. When the display score of a node 204 falls within a range associated with a particular size, the size is associated with the node 204.

In particular embodiments, other display characteristics, such as color, shape, animation, or icon may be determined based on one or more display scores determined for a node 204. Any suitable colors may be used, such as red, yellow, and green. Any suitable shape may be used, such as a circle, ellipse, or polygon. Any suitable icons may be used, such as an exclamation mark, stop sign, or other icon indicative of the importance of a node (in general or with respect to a particular context). Any suitable animation may be used, such as a blinking or oscillating animation. In particular embodiments, a relatively high display score for a node may result in a combination of a larger size and a more conspicuous color, shape, animation, and/or icon for that node.

In particular embodiments, one or more of these display characteristics may be based on a display score that is determined based on a particular context. For example, a size of the node may be based on a general display score and a color may be based on a display score associated with a particular context. After the display characteristics are determined, they may be associated with the corresponding nodes 204 and stored by computing system 104. In particular embodiments, display characteristics may be stored in node representation data 136.

At step 312, the display characteristics of a plurality of nodes 204 are provided to one or more of the administrators 112. For example, in some embodiments, the display characteristics may be provided to user devices 108 associated with administrators 112. User devices 108 may display some or all of the nodes 204 of the IT environment to administrators 112. The nodes 204 may be displayed according to the display characteristics determined by computing system 104. Administrators 112 may consult the display to quickly identify important nodes, read comments regarding the nodes from other administrators, and provide scores and comments for the nodes.

Modifications, additions, or omissions may be made to the methods disclosed herein without departing from the scope of the disclosure. The method may include more, fewer, or other steps. Additionally, steps may be performed in any suitable order.

Figure 4:
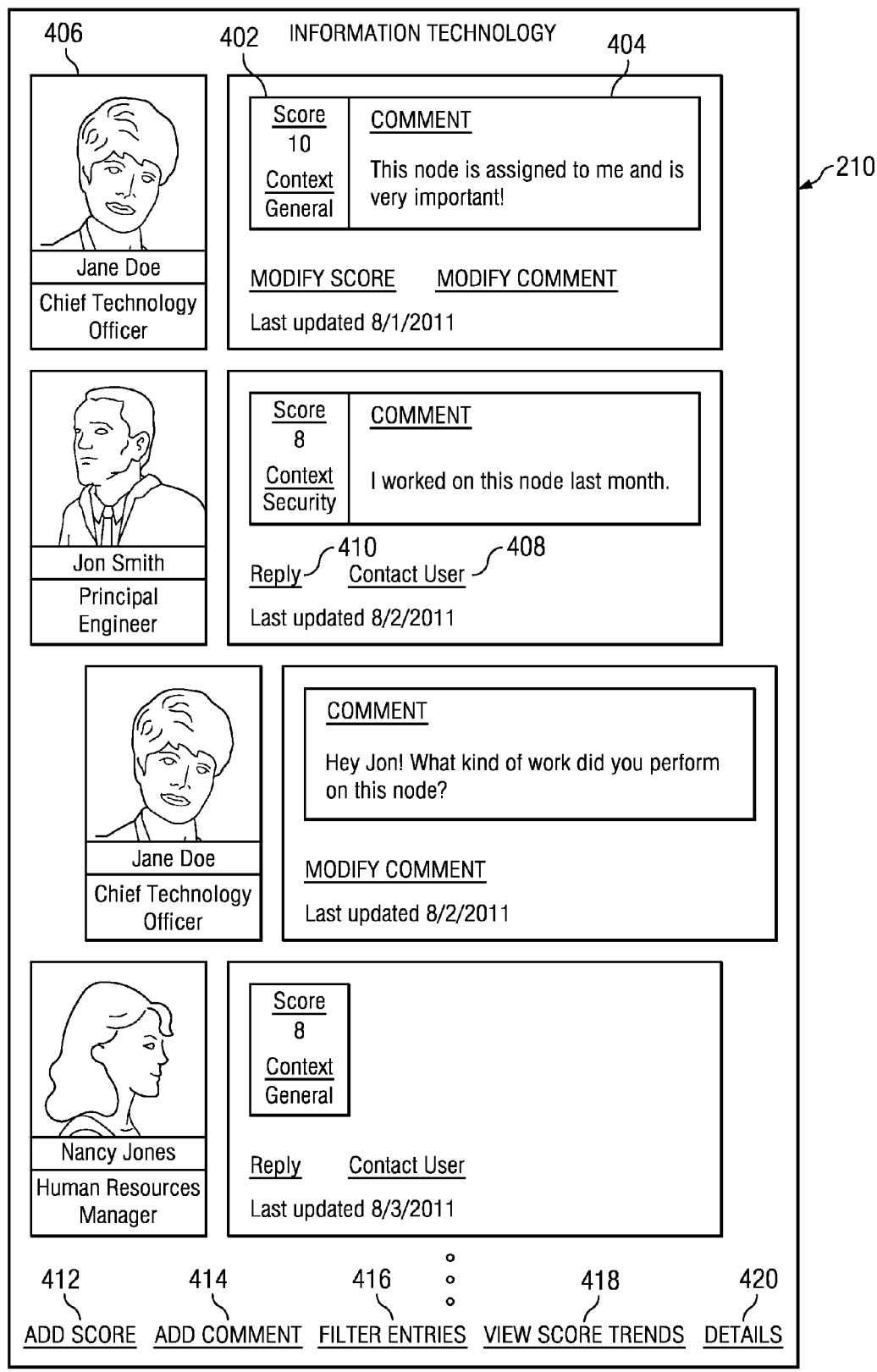
FIG. 4 depicts an example interface associated with a node of an IT environment that may be generated by the system of FIG. 1.

FIG. 4 depicts an example interface 210 associated with a node 204 (the Information Technology node) of an IT environment that may be generated by the system of FIG. 1. Interface 210 includes various information associated with node 204 and enables administrators 112 to view and edit information associated with node 204. In particular embodiments, interface 210 may be customized for the particular administrator who is viewing interface 210. For example, in the embodiment depicted, interface 210 is customized for the administrator Jane Doe.

In particular embodiments, interface 210 includes a record of scores 402 and comments 404 that have been received for a particular node 204. Interface 210 may include a user profile 406 that corresponds to an administrator 112 that provided a score or a comment about the node 204. In particular embodiments, user profile 406 may include a photo, name, job description, email address, telephone number, and/or other information associated with the administrator. In particular embodiments, interface 210 also includes a link 408 to the contact information of the administrator 112 that scored and/or or commented on the node. In some embodiments, an administrator 112 that views interface 210 may click on the link 408 and be directed to a form to send an email or instant message to the administrator 112 that provided information associated with node 204.

Interface 210 may also allow an administrator 112 to respond to comments posted by other administrators. For example, in the embodiment depicted, Jane Doe may respond to Jon Smith's comment by clicking on the reply link 410. Interface 210 may provide links for adding scores or comments (links 412 and 414 respectively) and to filter the scores and comments that are shown by interface 210 (via filter entries link 416). In particular embodiments, interface 210 includes an option to view scoring trends (link 418). For example, an administrator 112 may access a record of scores provided by administrators 112 for the particular node 204, a group of nodes, or all nodes of an IT environment (or a portion thereof). In particular embodiments, an administrator 112 may be able to see how many other administrators have viewed and/or scored a particular node (via details link 420). Interface 210 may also provide access to any other suitable information about the node 204, such as its operational status, cost, date of origin, or other suitable information.

As described, various embodiments of the present disclosure may enable evaluation of composite applications through graphical modeling. Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. Other changes, substitutions, and alterations are possible without departing from the spirit and scope of this disclosure, as defined by the following claims.

What is claimed is:

1. A method comprising:
   providing a representation of each of a plurality of nodes of an information technology (IT) environment to a plurality of administrators responsible for maintaining the IT environment;
   receiving, from the plurality of administrators responsible for maintaining the IT environment, a plurality of scores for each of two or more of the plurality of nodes, each score providing an assessment of a respective node of the plurality of nodes, wherein each score is associated with a corresponding context and each score is based on criteria related to the corresponding context;
   determining, by a first computing system, one or more display characteristics for each node for which one or more scores was received, the one or more display characteristics of a respective node comprising a size of the respective node that is based on at least the scores received for the respective node; and
   providing, to at least one administrator of the plurality of administrators responsible for maintaining the IT environment, the one or more display characteristics determined for each node for which one or more scores was received.

2. The method of claim 1, wherein the one or more display characteristics determined for a respective node of the plurality of nodes further comprise an administrator profile of each administrator of the plurality of administrators that provided a score for the respective node, each administrator profile comprising an indication of the respective administrator's name and one or more responsibilities of the administrator within the IT environment.

3. The method of claim 1, wherein the one or more display characteristics determined for a respective node of the plurality of nodes further comprise a plurality of comments about the respective node, the comments written by one or more of the administrators that provided a score for the respective node.

4. The method of claim 1, wherein the one or more display characteristics determined for a respective node of the plurality of nodes are further based on at least one score received for one or more nodes coupled to the respective node.

5. The method of claim 1, wherein the size of a respective node of the plurality of nodes is determined according to an algorithm that weights each score of at least a subset of the scores received for the respective node by the relative importance of the administrator that provides the score.

6. The method of claim 1, wherein the size of a respective node of the plurality of nodes is determined according to an algorithm that weights each score of at least a subset of the scores received for the respective node by the amount of time that has passed since the score was received.

7. The method of claim 1, wherein the one or more display characteristics determined for a respective node of the plurality of nodes further comprise a shape that is based on at least a subset of the scores received for the respective node.

8. The method of claim 1, wherein the one or more display characteristics determined for a respective node of the plurality of nodes further comprise a color that is based on at least a subset of the scores received for the respective node.

9. One or more tangible non-transitory computer-readable media having computer-executable code, when executed by a computing device operable to:
provide a representation of each of a plurality of nodes of an information technology (IT) environment to a plurality of administrators responsible for maintaining the IT environment;
receive, from the plurality of administrators responsible for maintaining the IT environment, a plurality of scores for each of two or more of the plurality of nodes, each score providing an assessment of a respective node of the plurality of nodes, wherein each score is associated with a corresponding context and each score is based on criteria related to the corresponding context;
determine one or more display characteristics for each node for which one or more scores was received, the one or more display characteristics of a respective node comprising a size of the respective node that is based on at least the scores received for the respective node; and
provide, to at least one administrator of the plurality of administrators responsible for maintaining the IT environment, the one or more display characteristics determined for each node for which one or more scores was received.

10. The one or more tangible non-transitory computer-readable media of claim 9, wherein the one or more display characteristics determined for a respective node of the plurality of nodes further comprise an administrator profile of each administrator of the plurality of administrators that provided a score for the respective node, each administrator profile comprising an indication of the respective administrator's name and one or more responsibilities of the administrator within the IT environment.

11. The one or more tangible non-transitory computer-readable media of claim 9, wherein the one or more display characteristics determined for a respective node of the plurality of nodes further comprise a plurality of comments about the respective node, the comments written by one or more of the administrators that provided a score for the respective node.

12. The one or more tangible non-transitory computer-readable media of claim 9, wherein the one or more display characteristics determined for a respective node of the plurality of nodes are further based on at least one score received for one or more nodes coupled to the respective node.

13. The one or more tangible non-transitory computer-readable media of claim 9, wherein the size of a respective node of the plurality of nodes is determined according to an algorithm that weights each score of at least a subset of the scores received for the respective node by the relative importance of the administrator that provides the score.

14. The one or more tangible non-transitory computer-readable media of claim 9, wherein the size of a respective node of the plurality of nodes is determined according to an algorithm that weights each score of at least a subset of the scores received for the respective node by the amount of time that has passed since the score was received.

15. The one or more tangible non-transitory computer-readable media of claim 9, wherein the one or more display characteristics determined for a respective node of the plurality of nodes further comprise a shape that is based on at least a subset of the scores received for the respective node.

16. The one or more tangible non-transitory computer-readable media of claim 9, wherein the one or more display characteristics determined for a respective node of the plurality of nodes further comprise a color that is based on at least a subset of the scores received for the respective node.

17. An apparatus comprising:
a memory; and
one or more processors coupled to the memory and configured to:
provide a representation of each of a plurality of nodes of an information technology (IT) environment to a plurality of administrators responsible for maintaining the IT environment;
receive, from the plurality of administrators responsible for maintaining the IT environment, a plurality of scores for each of two or more of the plurality of nodes, each score providing an assessment of a respective node of the plurality of nodes, wherein each score is associated with a corresponding context and each score is based on criteria related to the corresponding context;
determine one or more display characteristics for each node for which one or more scores was received, the one or more display characteristics of a respective node comprising a size of the respective node that is based on at least the scores received for the respective node; and
provide, to at least one administrator of the plurality of administrators responsible for maintaining the IT environment, the one or more display characteristics determined for each node for which one or more scores was received.

18. The apparatus of claim 17, wherein the one or more display characteristics determined for a respective node of the plurality of nodes further comprise an administrator profile of each administrator of the plurality of administrators that provided a score for the respective node, each administrator profile comprising an indication of the respective administrator's name and one or more responsibilities of the administrator within the IT environment.

19. The apparatus of claim 17, wherein the one or more display characteristics determined for a respective node of the plurality of nodes further comprise a plurality of comments about the respective node, the comments written by one or more of the administrators that provided a score for the respective node.

20. The apparatus of claim 17, wherein the one or more display characteristics determined for a respective node of the plurality of nodes are further based on at least one score received for one or more nodes coupled to the respective node.

21. The apparatus of claim 17, wherein the size of a respective node of the plurality of nodes is determined according to an algorithm that weights each score of at least a subset of the scores received for the respective node by the relative importance of the administrator that provides the score.

22. The apparatus of claim 17, wherein the size of a respective node of the plurality of nodes is determined according to an algorithm that weights each score of at least a subset of the scores received for the respective node by the amount of time that has passed since the score was received.

* * * * *